Patented Oct. 10, 1944

2,359,765

UNITED STATES PATENT OFFICE 2,359,765

VULCANIZATION OF RUBBER

Paul C. Jones, Silver Lake, Ohio, assignor to The B. F. Goodrich Company, New York, N. Y., a corporation of New York No Drawing. Application October 22, 1942, Serial No. 462,963

18 Claims. (Cl. 260—793)

This invention relates to the vulcanization of rubber and pertains more specifically to the use of zinc and lead salts of thiuram polysulfides as vulcanizing agents for rubber.

For many years sulfur has been the most important vulcanizing agent used with rubber, although from time to time the use of various other materials has been proposed. Among the vulcanizing agents other than sulfur which have been used have been the tetraalkyl thiuram polysulfides, which decompose when heated to give free sulfur. They possess, in common with the unsubstituted and disubstituted thiuram polysulfides, certain advantages over sulfur as a vulcanizing agent: the thiuram polysulfides as a class are more readily dispersed in the rubber; the sulfur is produced in situ gradually during the course of the vulcanization, thus tending to produce a more uniform vulcanization reaction; the sulfur produced by the decomposition of the thiuram sulfides is in a very finely divided condition and thus is in much more intimate contact with the rubber than is the case when relatively large particles of ground sulfur are introduced into the composition by mixing on a roll mill or in an internal mixer. However, the unsubstituted and disubstituted thiuram polysulfides suffer from the disadvantage that they tend to decompose not only at vulcanizing temperatures but even at room temperature. This characteristic makes impossible, of course, the storage of the materials for any length of time and restricts their commercial usefulness.

I have now discovered that the zinc and lead salts of various thiuram polysulfides, such as the di-, tri-, or tetrasulfides may be readily prepared and that they possess many of the advantages of the unsubstituted thiuram disulfides and in addition are quite stable at room temperature. The thiuram polysulfides of which the lead or zinc salts may be prepared include all those having at least one amino hydrogen atom. If all such hydrogens are replaced with alkyl groups it is impossible to form the lead or zinc salt of the compound, which, it is believed, is produced by tautomerization of the starting material, as indicated by the following equations, followed by replacement of the mercapto hydrogen with metal:

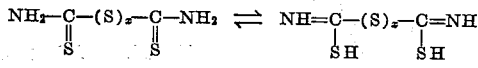

or

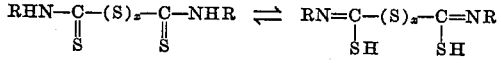

or

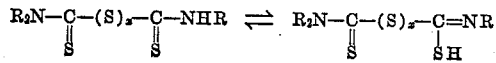

where R is a hydrocarbon group, and $x$ is an integer greater than 1.

Among the thiuram polysulfides of which the lead or zinc salts may be used as vulcanizing agents are the following:

Thiuram-di-, tri-, or tetrasulfide
Dimethyl-thiuram-di-, tri-, or tetrasulfide
Diethyl-thiuram-di, tri, or tetrasulfide
Dipropyl-thiuram-di-, tri-, or tetrasulfide
Dibutyl-thiuram-di-, tri-, or tetrasulfide
Diamyl-thiuram-di-, tri-, or tetrasulfide
Diphenyl-thiuram-di-, tri-, or tetrasulfide
Dibenzyl thiuram di-, tri-, or tetrasulfide
Dicyclohexyl-thiuram-di-, tri-, or tetrasulfide In general, the zinc or lead salts of the thiuram polysulfides may be prepared by dissolving the thiuram polysulfide in aqueous caustic alkali and adding to the solution an aqueous solution of a lead or zinc salt, whereupon the desired salt of the thiuram polysulfide separates from the solution in the form of a precipitate.

As a specific example of my invention I shall describe the preparation and use of the zinc salt of thiuram disulfide.

Example

To about 260 parts of a 38% aqueous ammonia solution was added a solution of 80 parts of sodium hydroxide in 3000 parts of water. About 184 parts of thiuram disulfide was then dissolved in this mixture at room temperature with stirring. In this instance ammonium hydroxide is added, in addition to the sodium hydroxide, in order to prevent the precipitation of any zinc hydroxide during the course of the reaction. A small amount of sediment was removed by filtration, and to this solution there was then added, with stirring, a solution of about 150 parts of zinc chloride in a small amount of water. The zinc salt of thiuram disulfide precipitated immediately. After standing for an hour, the product was separated from the reaction mixture by filtration, washed, and dried. About 161 parts by weight of dry product was obtained.

The product was then incorporated in the following rubber composition, in which the parts are by weight:

| | |
|---|---:|
| Rubber | 100.0 |
| Carbon black | 26.0 |
| Petroleum base softener | 1.4 |
| Paraffin | 1.4 |
| Zinc oxide | 5.3 |
| Stearic acid | 1.4 |
| Antioxidant | 1.4 |
| Tetramethyl thiuram monosulfide | 1.0 |
| Zinc salt of thiuram disulfide | 3.5 |

The composition was then vulcanized in a press at 307° F., after which it had the following properties:

| Time of vulcanization in min. | Ultimate tensile strength in lb./sq. in. | Ultimate elongation in percent |
|---|---|---|
| 5 | 2,710 | 700 |
| 15 | 2,510 | 675 |
| 50 | 2,220 | 705 |

These results make it clear that the composition vulcanizes extremely rapidly; however, there is very little overcuring, as shown by the elongation figures for the fifty-minute cure. That the composition is not "scorchy" is shown by the fact that it is not vulcanized after 30 minutes at 220° F. Similar results may be obtained by using the zinc salts of other thiuram polysulfides, and also the lead salts. In all cases these new vulcanizing agents may be used in amounts ranging from about 1.0 to about 30 parts per 100 parts of rubber.

My new vulcanizing agents are useful not only with natural rubber or caoutchouc, but also with balata, gutta percha, latex, rubber isomers, and any synthetic rubber which can be vulcanized with sulfur, such as copolymers of butadiene with styrene, acrylonitrile, methyl acrylate, methyl methacrylate, or isobutylene, and the term "a rubber" as used in the claims is intended to designate all of the aforementioned materials.

Any of the usual accelerators may be used in conjunction with my vulcanizing agents; the best results are usually secured, however, by using a non-reverting sulfhydryl-type accelerator, such as the mercaptoalkyl thiazoles, the mercaptobenzothiazoles, the mercaptothiazolines, the tetra-substituted thiuram monasulfides, the metallic dithiocarbamates, or the like.

The rubber compositions in which my new vulcanizing agents are used may also contain any of the usual pigments, fillers, softeners, reinforcing agents, antioxidants, or other ingredients commonly used in the rubber or plastics industry.

Although I have herein disclosed specific embodiments of my invention, I do not intend to limit myself solely thereto, but to include all of the modifications embraced within the terms of the appended claims.

I claim:

1. The process of vulcanizing a rubber which comprises heating it in the presence of a member of the class consisting of the lead and zinc salts of a thiuram polysulfide, said thiuram polysulfide containing at least one amino hydrogen atom.

2. The process of vulcanizing a rubber which comprises heating it in the presence of a member of the class consisting of the lead and zinc salts of a thiuram disulfide, said thiuram disulfide containing at least one amino hydrogen atom.

3. The process of vulcanizing a rubber which comprises heating it in the presence of a member of the class consisting of the lead and zinc salts of a thiuram trisulfide, said thiuram trisulfide containing at least one amino hydrogen atom.

4. The process of vulcanizing a rubber which comprises heating it in the presence of a member of the class consisting of the lead and zinc salts of a thiuram tetrasulfide, said thiuram tetrasulfide containing at least one amino hydrogen atom.

5. The process of vulcanizing a rubber which comprises heating it in the presence of the zinc salt of a thiuram polysulfide, said thiuram polysulfide containing at least one amino hydrogen atom.

6. The process of vulcanizing a rubber which comprises heating it in the presence of the zinc salt of a thiuram disulfide, said thiuram disulfide containing at least one amino hydrogen atom.

7. The process of vulcanizing rubber which comprises heating it in the presence of the zinc salt of a thiuram polysulfide, said thiuram polysulfide containing at least one amino hydrogen atom.

8. The process of vulcanizing rubber which comprises heating it in the presence of the zinc salt of a thiuram disulfide, said thiuram disulfide containing at least one amino hydrogen atom.

9. The process of vulcanizing a rubber in the presence of the zinc salt of thiuram disulfide.

10. A composition comprising a rubber vulcanized in the presence of a member of the class consisting of the lead and zinc salts of a thiuram polysulfide, said thiuram polysulfide containing at least one amino hydrogen atom.

11. A composition comprising a rubber vulcanized in the presence of a member of the class consisting of the lead and zinc salts of a thiuram disulfide, said thiuram disulfide containing at least one amino hydrogen atom.

12. A composition comprising a rubber vulcanized in the presence of a member of the class consisting of the lead and zinc salts of a thiuram trisulfide, said thiuram trisulfide containing at least one amino hydrogen atom.

13. A composition comprising a rubber vulcanized in the presence of a member of the class consisting of the lead and zinc salts of a thiuram tetrasulfide, said thiuram tetrasulfide containing at least one amino hydrogen atom.

14. A composition comprising a rubber vulcanized in the presence of the zinc salt of a thiuram polysulfide, said thiuram polysulfide containing at least one amino hydrogen atom.

15. A composition comprising a rubber vulcanized in the presence of the zinc salt of a thiuram disulfide, said thiuram disulfide containing at least one amino hydrogen atom.

16. A composition comprising rubber vulcanized in the presence of the zinc salt of a thiuram polysulfide, said thiuram polysulfide containing at least one amino hydrogen atom.

17. A composition comprising rubber vulcanized in the presence of the zinc salt of a thiuram disulfide, said thiuram disulfide containing at least one amino hydrogen atom.

18. A composition comprising a rubber vulcanized in the presence of the zinc salt of thiuram disulfide.

PAUL C. JONES.